J. H. DUNN.
COTTON CHOPPER AND CULTIVATOR.
APPLICATION FILED JUNE 21, 1907.

902,385.

Patented Oct. 27, 1908.
2 SHEETS—SHEET 1.

Witnesses
Edwin G. McKee
Wm Bagger

Inventor
James H. Dunn
By Victor J. Evans
Attorney

J. H. DUNN.
COTTON CHOPPER AND CULTIVATOR.
APPLICATION FILED JUNE 21, 1907.

902,385.

Patented Oct. 27, 1908.
2 SHEETS—SHEET 2.

Witnesses

Inventor
James H. Dunn
By Victor J. Evans
Attorney

UNITED STATES PATENT OFFICE.

JAMES H. DUNN, OF TIMOTHEY, LOUISIANA.

COTTON CHOPPER AND CULTIVATOR.

No. 902,385.  Specification of Letters Patent.  Patented Oct. 27, 1908.

Application filed June 21, 1907. Serial No. 380,115.

*To all whom it may concern:*

Be it known that I, JAMES H. DUNN, a citizen of the United States, residing at Timothey, in the parish of Webster and State of Louisiana, have invented new and useful Improvements in Cotton Choppers and Cultivators, of which the following is a specification.

This invention relates to machines for cultivating and chopping cotton, and it has for its object to provide a simple and efficient machine of this class, the frame of which may be also used for the purpose of supporting a planting mechanism of simple construction so that the single frame may be used for the various operations of planting, cultivating and chopping out cotton.

Further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

Figure 1:
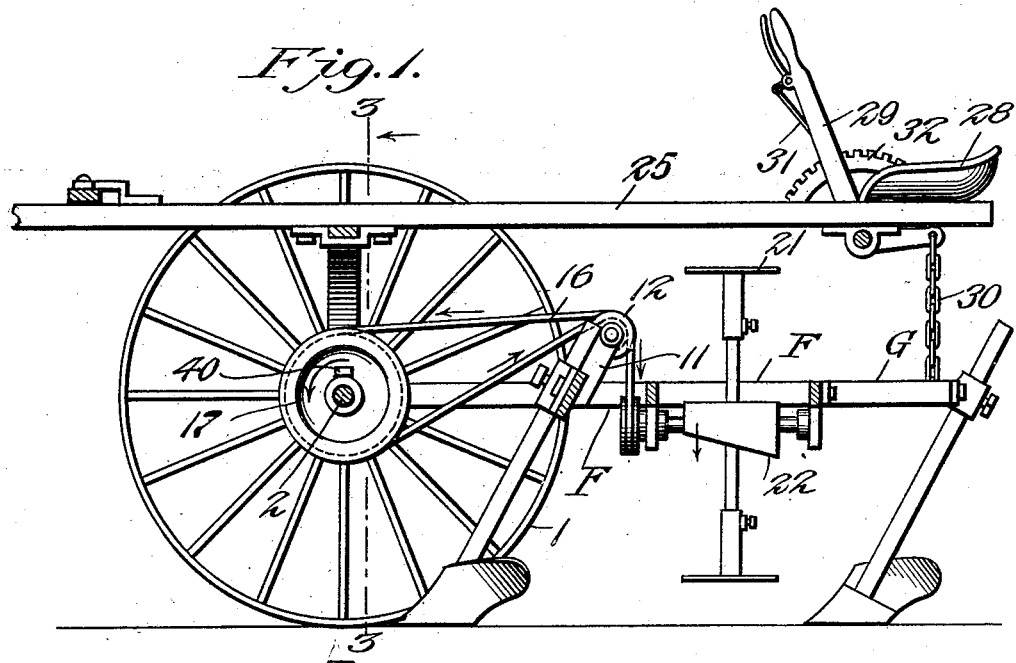
Figure 2:
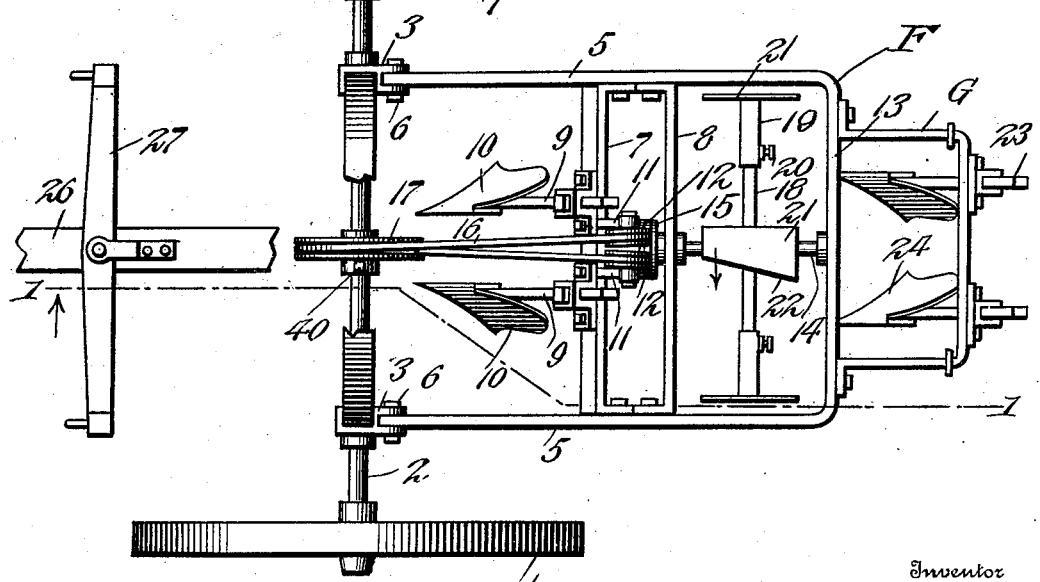
Figure 3:
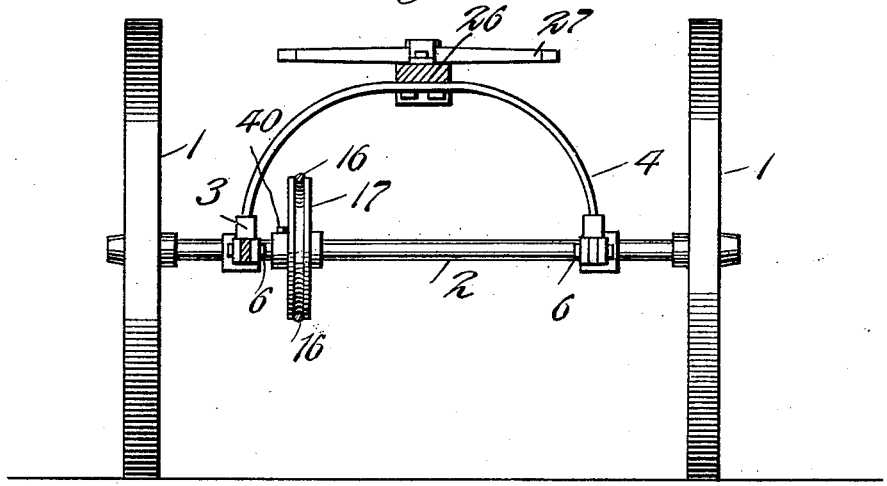
Figure 4:
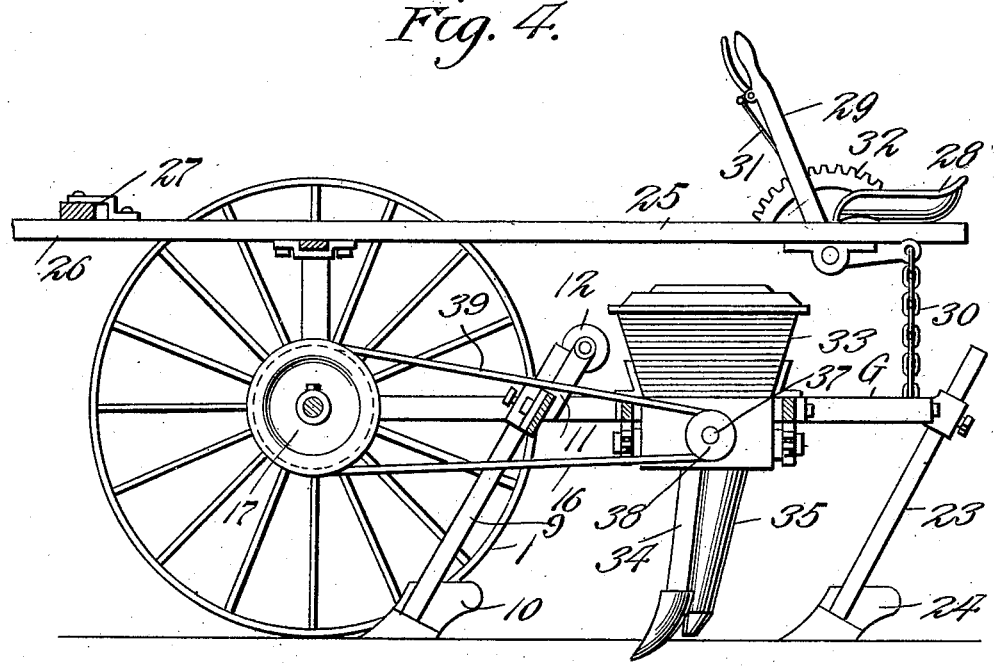

In the drawing, Figure 1 is a longitudinal sectional view of a machine embodying the invention, the same being taken on the plane indicated by the line 1—1 in Fig. 2. Fig. 2 is a top plan view of a machine embodying the invention, portions of the same having been broken away for the purpose of exposing the subjacent construction. Fig. 3 is a transverse sectional view taken on the plane indicated by the line 3—3 in Fig. 1. Fig. 4 is a longitudinal sectional view showing a planter substituted for the chopping hoes, which have been shown in Figs. 1 and 2.

Corresponding parts in the several figures are denoted by like characters of reference.

The transporting wheels 1—1 of the improved machine are fixed upon the axle 2, which latter is supported for rotation in boxes 3—3 which are connected with each other by means of a yoke or arch 4.

F designates a U-shaped frame, the side members of which 5—5 are connected hingedly at their front ends with the boxes 3—3, by means of pins or bolts 6 so that the rear end of said frame will be capable of swinging in a vertical plane. The frame F is provided with cross-pieces 7 and 8, the former of which is located in front of the latter. Said front cross-bar 7 serves to support a pair of vertically adjustable shanks or standards 9—9 carrying plates or scrapers 10; said cross-bar 7 also supports a pair of uprights 11 carrying guide pulleys 12. The cross-bar 8, in conjunction with the rear member 13 of the frame F is provided with bearings for a shaft 14 having a pulley 15 which receives motion by means of an endless flexible element such as a band 16 from a pulley 17 fixed upon the axle 2; the endless flexible element being guided over the pulleys 12. Rotary motion will thus be transmitted to the shaft 14 when the machine is in motion.

When the machine is used as a cotton chopper, the shaft 14 is provided with radial arms 18 carrying sleeves 19 adjustable thereon and capable of being secured by means of set screws 20; said sleeves carrying the chopping hoes 21 which may be of any desired dimensions; as a rule it will be preferred to supply, with each machine several sets of hoes of various dimensions, in order to enable the machine to be used for chopping out stands of cotton at varying distances apart. Pulleys of different sizes may also be used, in order that the shaft 14 may be driven at any desired speed. It is preferred that the blades of the chopping hoes be set obliquely, or be provided with oblique cutting edges, as shown in Figs. 1 and 2, at 22 so that when the chopping mechanism is in operation the rear end of the hoe will first engage the ground, and a shearing cut will be made as the machine progresses, thus making a clean cut of the plants which it is desired to remove.

Suitably secured upon the rear end of the frame F is an auxiliary frame G carrying vertically adjustable standards 23 provided with blades 24 that are constructed to throw the dirt in an inward direction toward the row of plants that are being operated upon.

The yoke or arch 4 supports a longitudinal frame bar 25 which is extended forwardly to form a tongue 26 upon which a doubletree 27 is secured in the usual manner, for the attachment of the draft. Upon the rear end of the frame bar 25 has been shown a seat 28 for the driver or operator; said frame bar also supports a bell crank lever 29 one arm of which is connected with the auxiliary frame G by means of a chain 30; the other arm of the bell crank lever is provided with a suitably operated stop member 31 engaging a segment rack 32 for the purpose of securing the parts at the desired adjustment. It can be seen that the frames F and G, which are rigidly connected with each other, will be simultaneously adjusted by the operating lever 29; the chain 30 having been shown connected with the frame G merely for convenience; it is obvious that said chain may be connected in any suitable manner with the frame F within the scope of the invention.

When the machine is used as a cotton chopper and cultivator the blades 10 will work close to the row of growing plants, and will serve to bar off the row, throwing grass, weeds and the like into the space between the rows, and leaving the row of plants in perfect condition to be operated upon by the chopping mechanism which serves to chop out the plants that it is desired to eradicate leaving stands of suitable dimensions, the sizes of which will be regulated by the dimensions of the chopping hoes that are employed. The blades 24 will serve to throw the moist pulverized dirt back over the roots of the plants, which will thus be nourished and strengthened, and their rapid and luxuriant growth promoted.

When it is desired to use the machine for planting purposes, the entire chopping mechanism will be removed from the frame and a seed box 33 set in its place, using the same bolts or connecting means to hold it in place that is employed in holding shaft 14 in its boxing; the end of the agitator carrying shaft 37 is extended through the side of the seed box, and is provided with a pulley 38 connected by a driving band 39 with the main pulley 17 on the axle where said main pulley is secured movably by means of a set screw 40 so that it can be moved and fastened in line with the pulley of the agitator carrying shaft. When using the planter it will not be necessary to run the band 39 over the guide pulleys 12. The small plows 24 used following the chopping mechanism can be used for covering the seed when planting; or, as it is preferred by some farmers to cover seed with a board, the plows can be removed from the standards and a covering board substituted, using the same bolts that are used for fastening the plows. By means of the provision and arrangement of the guide pulleys 12, the same driving band may be used for actuating the shafts of the chopper or planter.

From the foregoing description taken in connection with the drawings hereto annexed, the operation and advantages of this invention will be readily understood by those skilled in the art to which it appertains. Heretofore separate machines have been employed for planting and cultivating purposes as well as for chopping out the cotton unless the latter has been performed by hand which is a slow and tedious operation.

The improved machine furnishes means for planting, cultivating and chopping the cotton in a speedy efficient and inexpensive manner, and the machine itself may be manufactured at an expense but slightly exceeding that of an ordinary cultivator. It may be readily operated by a double team without excessively straining the team.

Having thus fully described the invention, what is claimed as new is:—

In a machine of the class described, a pair of axle boxes, an arch connecting the same, an axle journaled in the boxes and having carrying wheels fast thereon, a drive pulley on said axle, means for adjusting said pulley lengthwise of the axle, a main frame pivotally connected to said boxes and embodying side bars and parallel cross bars connecting the same and provided with bearings for interchangeable mechanical farming devices, uprights connected with the central portion of one of the cross bars, guide pulleys journaled on said uprights above the plane of the main frame, a driving band adapted for coöperation with said drive pulley and also adapted to be directed by said guide pulleys, shovels connected to said frame, a superimposed frame bar supported by the arch, and means connected to said frame bar and main frame for effecting the up and down adjustment on the main frame.

In testimony whereof, I affix my signature in presence of two witnesses.

JAMES H. DUNN.

Witnesses:
R. L. CLEMENS,
W. R. OAKLEY.